US011114956B2

(12) United States Patent
Camburn et al.

(10) Patent No.: US 11,114,956 B2
(45) Date of Patent: Sep. 7, 2021

(54) MAGNETIC LEVITATOR

(71) Applicant: SINGAPORE UNIVERSITY OF TECHNOLOGY AND DESIGN, Singapore (SG)

(72) Inventors: Bradley Camburn, Singapore (SG); Kristin Wood, Singapore (SG); Zach Huang, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 173 days.

(21) Appl. No.: 15/756,487

(22) PCT Filed: Aug. 26, 2016

(86) PCT No.: PCT/SG2016/050419
§ 371 (c)(1),
(2) Date: Feb. 28, 2018

(87) PCT Pub. No.: WO2017/039540
PCT Pub. Date: Mar. 9, 2017

(65) Prior Publication Data
US 2018/0269809 A1 Sep. 20, 2018

(30) Foreign Application Priority Data
Aug. 28, 2015 (SG) .............................. 10201506823S

(51) Int. Cl.
*H02N 15/00* (2006.01)
*H01F 7/02* (2006.01)
*H02K 7/09* (2006.01)

(52) U.S. Cl.
CPC ........... *H02N 15/00* (2013.01); *H01F 7/0278* (2013.01); *H02K 7/09* (2013.01)

(58) Field of Classification Search
CPC ......... H01F 7/0278; H02K 7/09; H02N 15/00
See application file for complete search history.

(56) References Cited

U.S. PATENT DOCUMENTS 3,614,181 A * 10/1971 Meeks ................ F16C 32/0425
310/90.5
4,340,260 A * 7/1982 Forster ................ F16C 32/0429
310/90.5

(Continued)

FOREIGN PATENT DOCUMENTS

WO 2009038464 A2 3/2009
WO 2017039540 3/2017

OTHER PUBLICATIONS

Foreign Correspondence From a Related Counterpart Application, International Search Report and Written Opinion dated Nov. 23, 2016, International Application No. PCT/SG2016/050419 filed on Aug. 26, 2016.

*Primary Examiner* — Bernard Rojas

(57) ABSTRACT

The present invention relates to a magnetic levitator. The magnetic levitator comprises a first portion having a first arrangement of a plurality of permanent magnets, and the first arrangement has first and second circumferences. The magnetic levitator also comprises a second portion having a second arrangement of a plurality of permanent magnets, and the second arrangement has a third circumference. The first and second arrangements are rotationally symmetrical, and the first circumference is larger than the third circumference. In use, one of the portions is magnetically levitated by the other one of the portions, and the second circumference is arranged substantially aligned to the third circumference.

18 Claims, 14 Drawing Sheets

(56) References Cited

U.S. PATENT DOCUMENTS

| | | | | |
|---|---|---|---|---|
| 5,506,459 A * | 4/1996 | Ritts | ............... | A63H 1/00 |
| | | | | 310/90.5 |
| 6,218,751 B1 * | 4/2001 | Bohlin | ............... | F16C 32/0417 |
| | | | | 310/90.5 |
| 6,781,270 B2 * | 8/2004 | Long | ............... | A63H 33/26 |
| | | | | 310/152 |
| 7,126,244 B2 * | 10/2006 | Rozmus | ............... | F16C 29/00 |
| | | | | 310/90.5 |
| 7,501,922 B2 * | 3/2009 | Kazadi | ............... | F16C 32/0429 |
| | | | | 335/284 |
| 8,338,976 B2 * | 12/2012 | Kazadi | ............... | H02N 15/00 |
| | | | | 290/44 |
| 8,902,031 B2 * | 12/2014 | Compter | ............... | F16C 32/0434 |
| | | | | 335/306 |
| 2006/0044094 A1 * | 3/2006 | Davis | ............... | H02N 15/00 |
| | | | | 335/220 |

* cited by examiner

MAGNETIC LEVITATOR

CROSS-REFERENCE TO RELATED APPLICATIONS

The present application is a filing under 35 U.S.C. 371 as the National Stage of International Application No. PCT/SG2016/050419, filed Aug. 26, 2016 entitled "A MAGNETIC LEVITATOR," which claims priority to Singapore Application No. SG 10201506823S filed with the Intellectual Property Office of Singapore on Aug. 28, 2015 and entitled "A MAGNETIC LEVITATOR," both of which are incorporated herein by reference in their entirety for all purposes.

FIELD OF THE INVENTION

The present invention relates to a magnetic levitator and a device comprising the magnetic levitator.

BACKGROUND OF THE INVENTION

A levitator or in other words, a levitation product (i.e. one having at least a part appearing to float in mid-air) has several applications. For example, it can be used as an aesthetically appearing structure for decorative purposes.

There are levitation products which have been developed to date. However, several of these products use electromagnets and hence, require an external power supply. Further, some of the products use certain arrangements of magnets producing purely attractive or repulsive forces to achieve the levitation. Levitation achieved with such arrangements of magnets tends to be unstable and many of these require the levitated part to be rotating. In addition, some of the products also do not allow the levitated part to rotate freely or to move back to a particular position after it has been displaced from this position.

SUMMARY OF THE INVENTION

The present invention aims to provide a new and useful levitator.

In general terms, the present invention proposes a magnetic levitator having two arrangements of permanent magnets, one of which is smaller than the other. The arrangements are rotationally symmetrical and aligned with each other to cause the levitation of one arrangement by the other arrangement.

A first aspect of the present invention is a magnetic levitator comprising: a first portion having a first arrangement of a plurality of permanent magnets, and the first arrangement has first and second circumferences; and a second portion having a second arrangement of a plurality of permanent magnets, and the second arrangement has a third circumference, wherein the first and second arrangements are rotationally symmetrical, and the first circumference is larger than the third circumference, and wherein in use, one of the portions is magnetically levitated by the other one of the portions, and the second circumference is arranged substantially aligned to the third circumference.

The above forms a magnetic well bearing which provides a restorative force to deflections of the arrangements along an axial direction. In particular, this restorative force holds the first and second arrangements at a set distance from each other. When there is a movement of one or both of the arrangements along the axial direction causing the distance between the arrangements to change (either increase or decrease), the restorative force urges at least one of the arrangements along the axial direction so as to restore the distance between the arrangements back to the set distance. This thus achieves an effective magnetic levitation of one portion by the other portion. Note that by "magnetic levitation of one portion by the other portion", it is meant that the one portion is maintained at a certain distance from the other portion. Both portions can be free to move. Alternatively, the second portion can be fixed in position while the first portion is free to move. Yet alternatively, the first portion can be fixed in position while the second portion is free to move.

A second aspect of the present invention is a device comprising: a first portion having a first arrangement of a plurality of permanent magnets, and the first arrangement has first and second circumferences; a second portion having a second arrangement of a plurality of permanent magnets, and the second arrangement has a third circumference; a third portion removably coupled to the second portion; and a supporting device configured to coaxially and movably couple the first, second and third portions, wherein the first and second arrangements are rotationally symmetrical, and the first circumference is larger than the third circumference, and wherein in use, the third portion is magnetically levitated via the second portion by the first portion, and the second circumference is arranged substantially aligned to the third circumference.

A third aspect of the present invention is a device comprising: a first portion having a first arrangement of a plurality of permanent magnets, and the first arrangement has first and second circumferences; a second portion having a second arrangement of a plurality of permanent magnets, and the second arrangement has a third circumference; a third portion removably coupled to the first portion; and a supporting device configured to coaxially and movably couple the first, second and third portions, wherein the first and second arrangements are rotationally symmetrical, and the first circumference is larger than the third circumference, and wherein in use, the third portion is magnetically levitated via the first portion by the second portion, and the second circumference is arranged substantially aligned to the third circumference.

BRIEF DESCRIPTION OF THE FIGURES

An embodiment of the invention will now be illustrated for the sake of example only with reference to the following drawings, in which.

DETAILED DESCRIPTION OF THE EMBODIMENTS

Figure 1A:
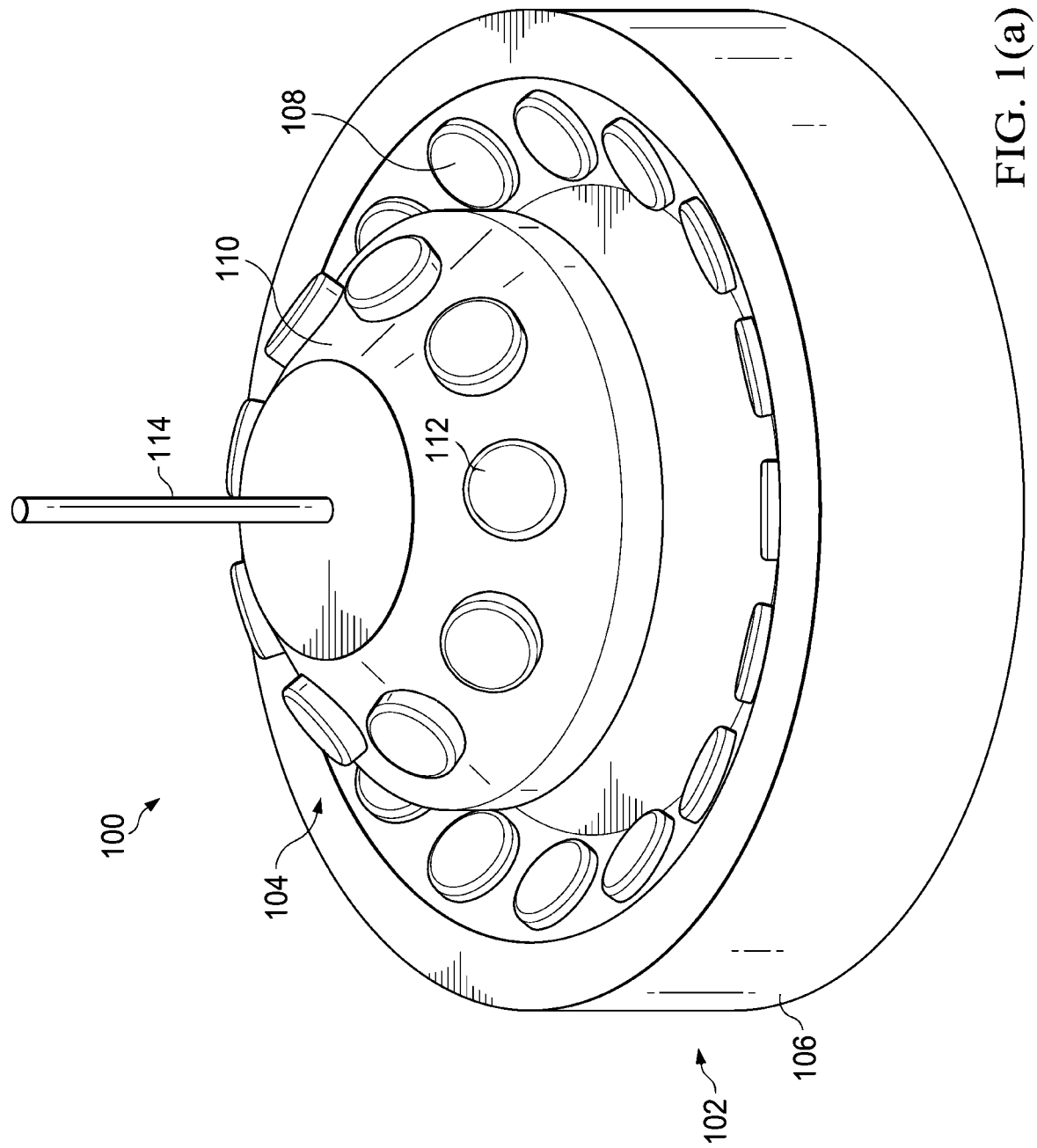
FIGS. 1(a)-1(b) respectively shows a perspective view and a side view of a magnetic levitator according to a first embodiment of the present invention.
Figure 1B:
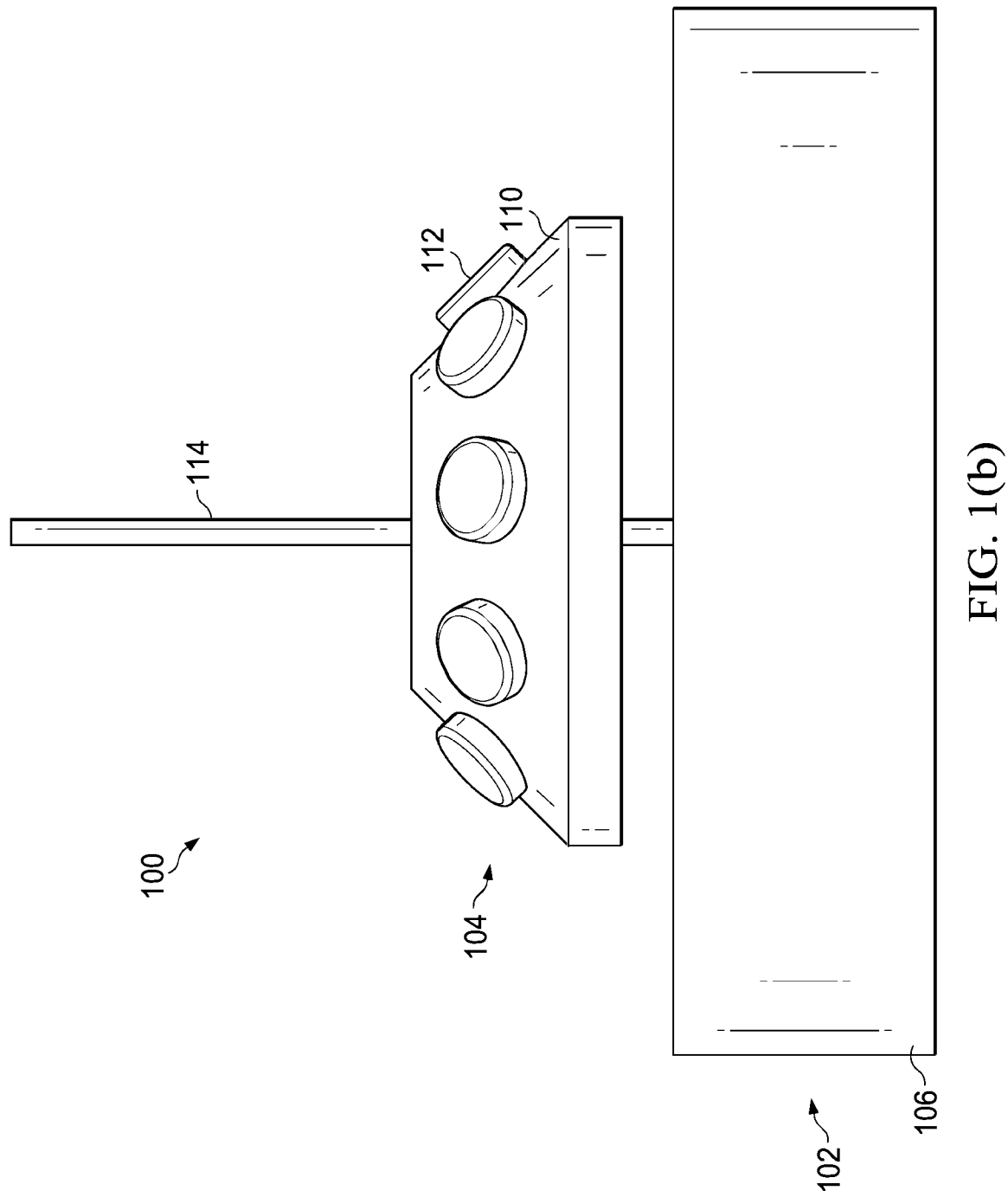

FIG. 1(a) and FIG. 1(b) respectively show a perspective view and a side view of a magnetic levitator 100 according to a first embodiment of the present invention.

The magnetic levitator 100 comprises a first portion 102 and a second portion 104. The first portion 102 includes a first support structure 106 which has a dish-like shape having a diameter of 4 cm and a convex top surface. The first portion 102 also includes a first arrangement (in the form of a circular array) of magnets 108 held in respective first magnet holes around a boundary of the convex top surface. The second portion 104 includes a second support structure 110 which has a frusto-conical shape. The second portion 104 further includes a second arrangement (also in the form of a circular array) of magnets 112 held in respective second magnet holes around a surface of the frusto-conical support structure 110. The first and second arrangements of magnets 108, 112 are each rotationally symmetrical and in each arrangement, the magnets 108, 112 are regularly spaced apart (in other words, the first and second arrangements are uniformly arranged). Each magnet 108, 112 of the magnetic levitator 100 is a permanent magnet and is cylindrical in shape. The first and second portions 102, 104 are configured such that in use, the second portion 104 is magnetically levitated by the first portion 102 (causing it to appear to be floating) by magnetic forces arising from interactions between the first and second arrangements of the magnets 108, 112.

The first and second support structures 106, 110 each comprises a support hole through which a supporting device (or support axle) in the form of a transparent rod 114 extends. The rod 114 has a longitudinal axis and is configured to coaxially and movably couple the first and second portions 102, 104 when in use. In particular, the rod 114, and each of the first and second portions 102, 104 are movable and rotatable relative to each other. In other words, the rod 114 is movable along its longitudinal axis and is also rotatable about this axis. The first and second portions 102, 104 are movable along the rod 114 and are rotatable about the rod 114. The rod 114 serves to restrict translation of the first and second portions 102, 104 to along its longitudinal axis.

Figure 2A:
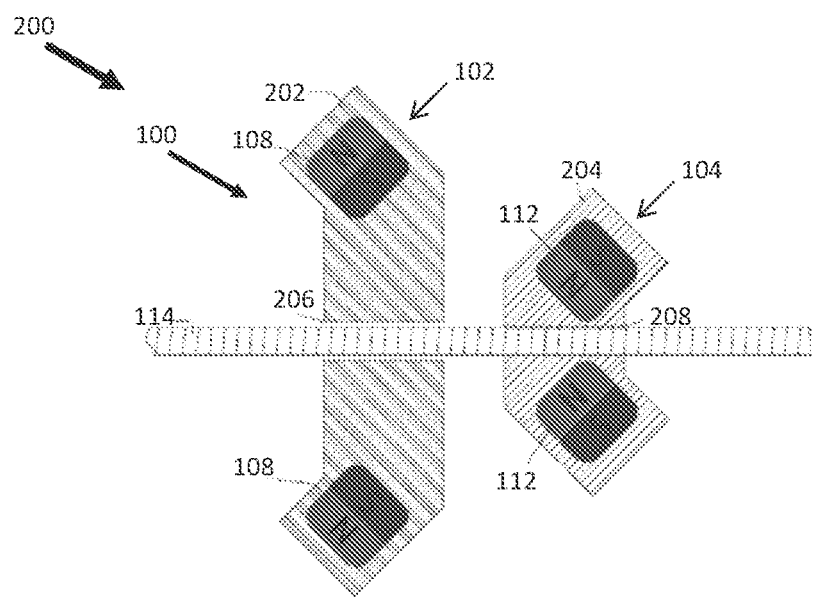
FIG. 2(a) shows a cross-sectional view of a structure including the magnetic levitator of FIG. 1(a) and FIG. 2(b) shows the structure of FIG. 2(a) with only magnets of the levitator.

FIG. 2(a) shows a cross-sectional view of a structure 200 including the magnetic levitator 100. The structure 200 comprises a first housing 202 in which the first portion 102 of the magnetic levitator 100 is held and a second housing 204 in which the second portion 104 of the magnetic levitator 100 is held. A pillow block 206 couples the first housing 202 (together with the first portion 102 of the magnetic levitator 100) with the rod 114. This prevents the first portion 102 from moving along the rod 114, but allows the first portion 102 to rotate about the rod 114. On the other hand, a sliding bearing 208 couples the second housing 204 (together with the second portion 104 of the magnetic levitator 100) to the rod 114. This allows the second portion 104 to both rotate about and move along the rod 114.

Figure 2B:
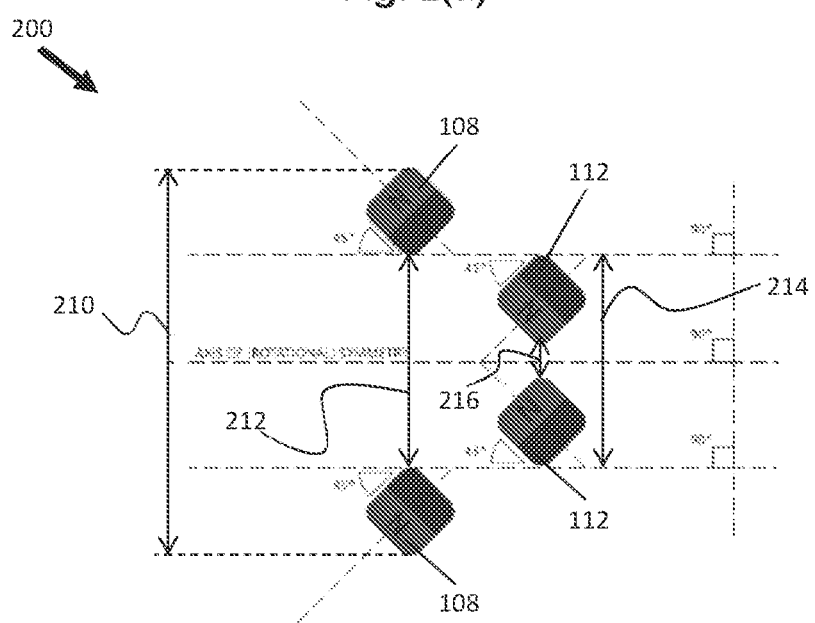

FIG. 2(b) shows the cross-sectional view of the structure 200 with only the magnets 108, 112 and with more details on the orientation of the magnets 108, 112. The first arrangement of magnets 108 has a first circumference with a first diameter 210 (which is the largest circumference i.e. the outer circumference of the first arrangement). The first arrangement of magnets 108 also has a second circumference with a second diameter 212 (which is the smallest circumference i.e. inner circumference of the second arrangement). Similarly, the second arrangement of magnets 112 has a third circumference with a third diameter 214 (which is the largest circumference i.e. outer circumference of the second arrangement) and a fourth circumference with a fourth diameter 216 (which is the smallest circumference i.e. inner circumference of the second arrangement). It is to be appreciated that the context of outer and inner circumference means that the first circumference is arranged outer to the second circumference, and thus the second circumference is accordingly arranged inner to the first circumference. Similarly, the third circumference is arranged outer to the fourth circumference, and thus the fourth circumference is accordingly arranged inner to the third circumference.

As shown in FIG. 2(b), the first diameter 210 is larger than the third diameter 214. In other words, the first circumference is larger than the third circumference. Thus, the first arrangement of magnets 108 can be referred to as the bigger (or outer) array of magnets 108, whereas the second arrangement of magnets 112 can be referred to as the smaller (or inner) array of magnets 112. The bigger and smaller arrays of magnets 108, 112 are configured with the second circumference substantially equal to the third circumference. In the structure 200, the bigger and smaller arrays are arranged with the second circumference substantially aligned to the third circumference.

The magnets 108 of the bigger array are oriented with their South poles facing towards the smaller array and their North poles facing away from the smaller array. Further, the plurality of permanent magnets 108 of the bigger array are arranged to cause the magnetic poles of respective permanent magnets 108 to be oriented at 45 degrees with respect to the longitudinal axis of the first portion 102. More specifically, each magnet 108 of the bigger array is tilted with respect to the longitudinal axis of the first portion 102 at an angle of 45 degrees towards a center of the bigger array as viewed from the smaller array. On the other hand, the magnets 112 of the smaller array are oriented with their North poles facing towards the bigger array and their South poles facing away from the bigger array. The plurality of permanent magnets 112 of the smaller array are also arranged to cause the magnetic poles of respective permanent magnets 112 to be orientated at 45 degrees with respect to the longitudinal axis of the second portion 104. More specifically, each magnet 112 of the smaller array is tilted with respect to the longitudinal axis of the second portion 104 at an angle of 45 degrees towards a center of the smaller array as viewed from the bigger array. Thus, the fields of the smaller and bigger arrays are perpendicular and are each at 45 degrees to the axial direction of the rotationally symmetric arrays.

In use, the second portion 104 of the levitator 100 (and hence, the second housing 202 of the structure 200) is magnetically levitated by the first portion 102 due to a locking effect achieved by the above-described configuration. In particular, the second portion 104 is held at a neutral position (or in other words, locked at a locking well position) at a distance from the first portion which is fixed in position along the rod 114.

The locking effect is achieved by having the bigger and smaller arrays cooperatively configured to cause like magnetic poles of the magnets 108, 112 of the arrays to repel to collectively generate a first region of magnetic field, and to cause unlike magnetic poles of the magnets 108, 112 of the arrays to attract to collectively generate a second region of magnetic field. To elaborate, when the second portion 104 is brought towards or away from the first portion 102 (i.e. moved from its neutral position), the relative proximities of the North and South poles of the magnets 108, 112 of the arrays change. This gives rise to two regions—a first region in which the like poles of the arrays (North-North, South-South) are closer to each other, causing the magnets 108, 112 to repel against each other, and a second region in which the unlike poles of the arrays (North-South, South-North) are closer to each other, causing the magnets 108, 112 to attract each other. These regions of magnetic fields interact in equilibrium to enable magnetic levitation of the second portion 104 by the first portion 102.

Figure 3A:
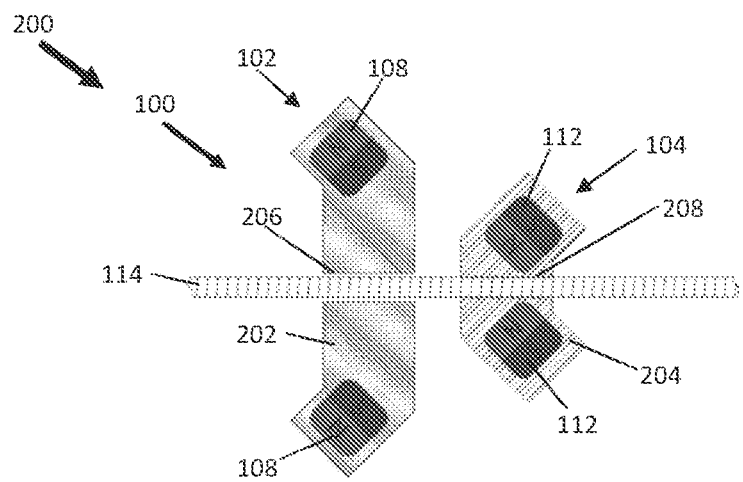
FIGS. 3(a)-3(c) illustrate a locking effect achieved by the magnetic levitator of FIG. 1(a)
Figure 3B:
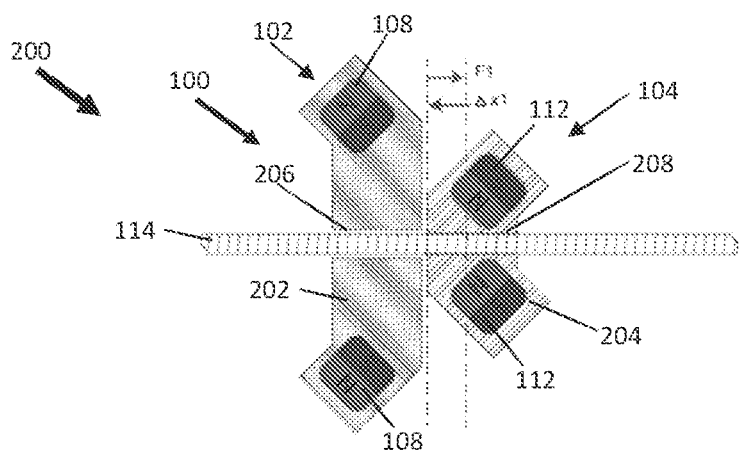
Figure 3C:
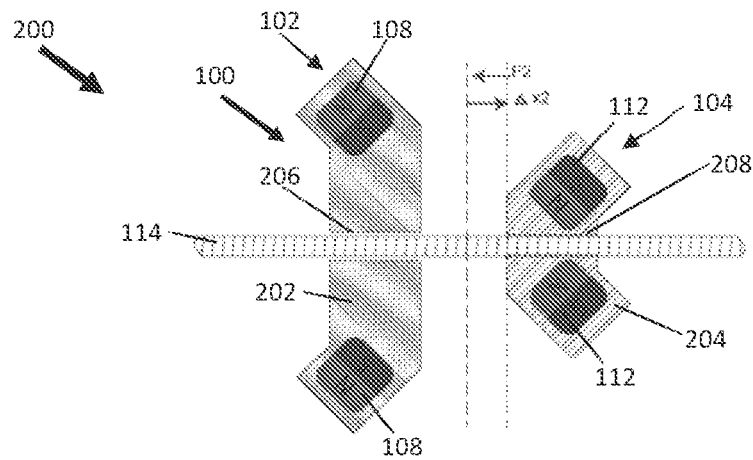

FIGS. 3(*a*)-3(*c*) illustrate the locking effect.

Specifically, FIG. 3(*a*) shows the second portion 104 of the levitator 100 in a neutral position. In this case, the attractive forces between the unlike poles (North-South or South-North) of the magnets 108, 112 in the respective arrays are nearly equal to the repulsive forces between the like poles (North-North or South-South) of these magnets 108, 112. Thus, there is no net force and the second portion 104 comprising the smaller array stays in the neutral position. The second portion 104 is free to rotate about the rod 114 when in the neutral position.

FIG. 3(*b*) shows the second portion 104 urged towards the first portion 102 by a distance of Δ×1. This causes the distances between the like poles of the magnets 108, 112 of the respective arrays to be shorter than the distances between the unlike poles of these magnets 108, 112. Thus, the attractive forces between the magnets 108, 112 are weaker than the repulsive forces between these magnets 108, 112. As a result, there is a net magnetic repulsive force F1 urging the arrays (and hence the portions 102, 104) apart. Since the first housing 202 holding the first portion 102 is prevented from moving along the rod 114, the force F1 urges the second portion 104 away from the first portion 102 by the same distance it was moved i.e. Δ×1. This in turn moves the second portion 104 back to the neutral position where the attractive and repulsive forces between the magnets 108, 112 are balanced. In this neutral position, the second portion 104 is acted on by equal and opposite non-zero forces, resulting in zero net force. The net repulsive force F1 may be referred to as a restorative force that acts to restore the position of the second portion 104 to the neutral position.

FIG. 3(*c*) shows the second portion 104 urged away from the first portion 102 by a distance of Δ×2. This causes the distances between the like poles of the magnets 108, 112 in the respective arrays to be longer than the distances between the unlike poles of these magnets 108, 112. Thus, the attractive forces between the magnets 108, 112 are stronger than the repulsive forces between these magnets 108, 112. As a result, there is a net magnetic attractive force F2 urging the smaller and bigger arrays together. Again, since the first housing 202 is prevented from moving along the rod 114, the force F2 pulls the second portion 104 towards the first portion 102 by the same distance it was moved i.e. Δ×2. This moves the second portion 104 back to the neutral position. In this case, the net attractive force F2 is the restorative force.

Figure 4A:
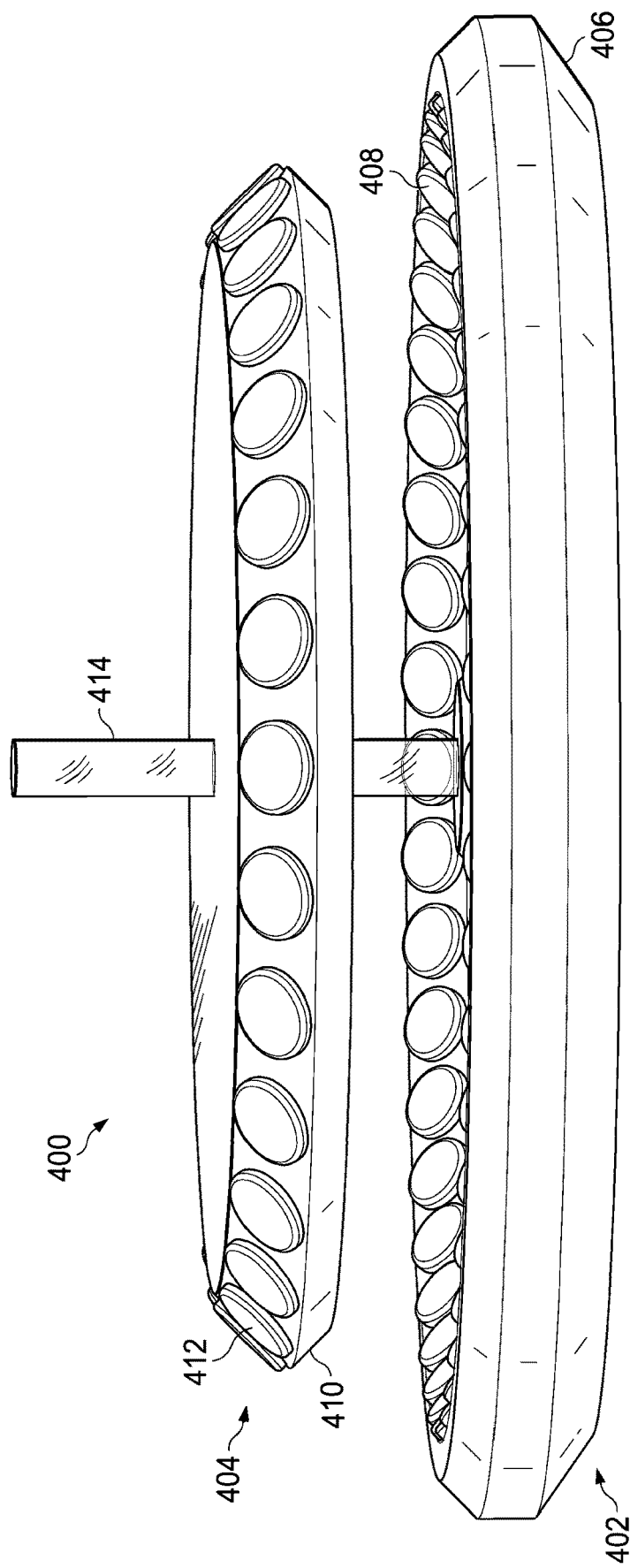
FIG. 4(a) shows a perspective view of a magnetic levitator according to a second embodiment of the present invention.
Figure 4B:
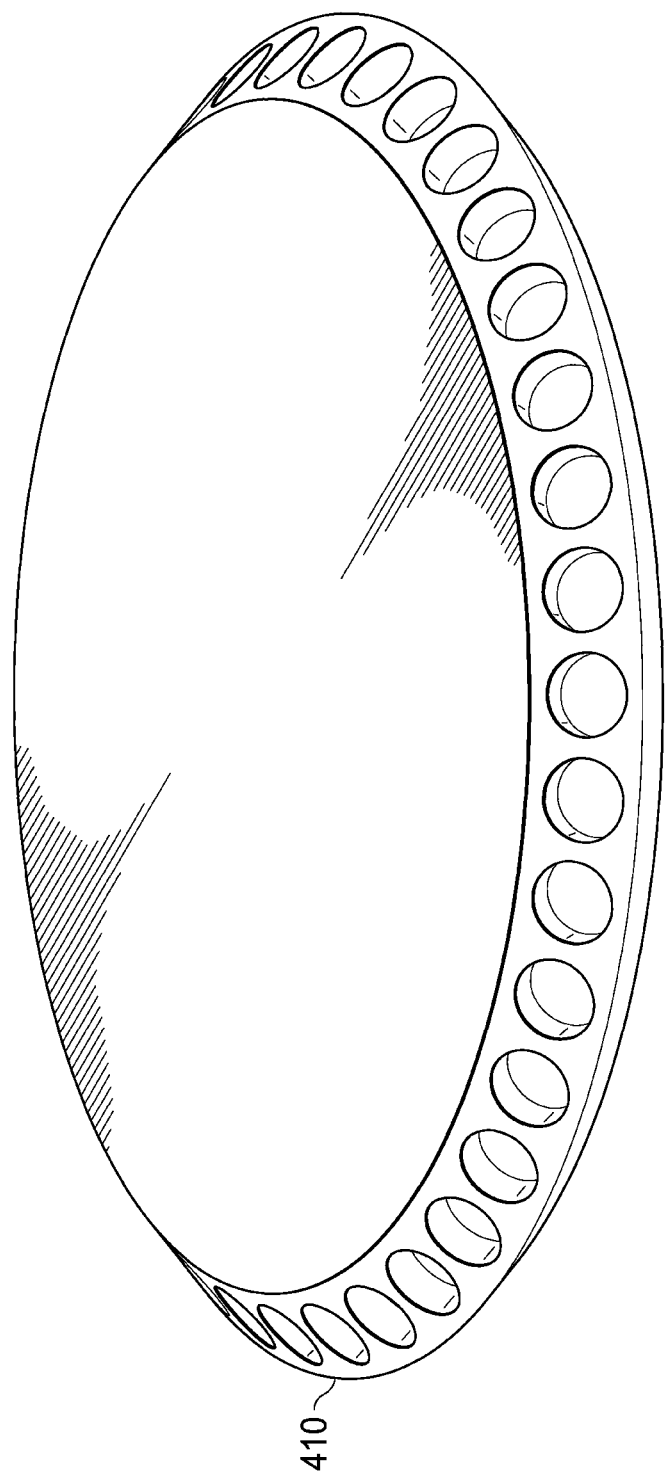
FIGS. 4(b)-4(c) show schematic diagrams of support structures of the magnetic levitator of FIG. 4(a)
Figure 4C:
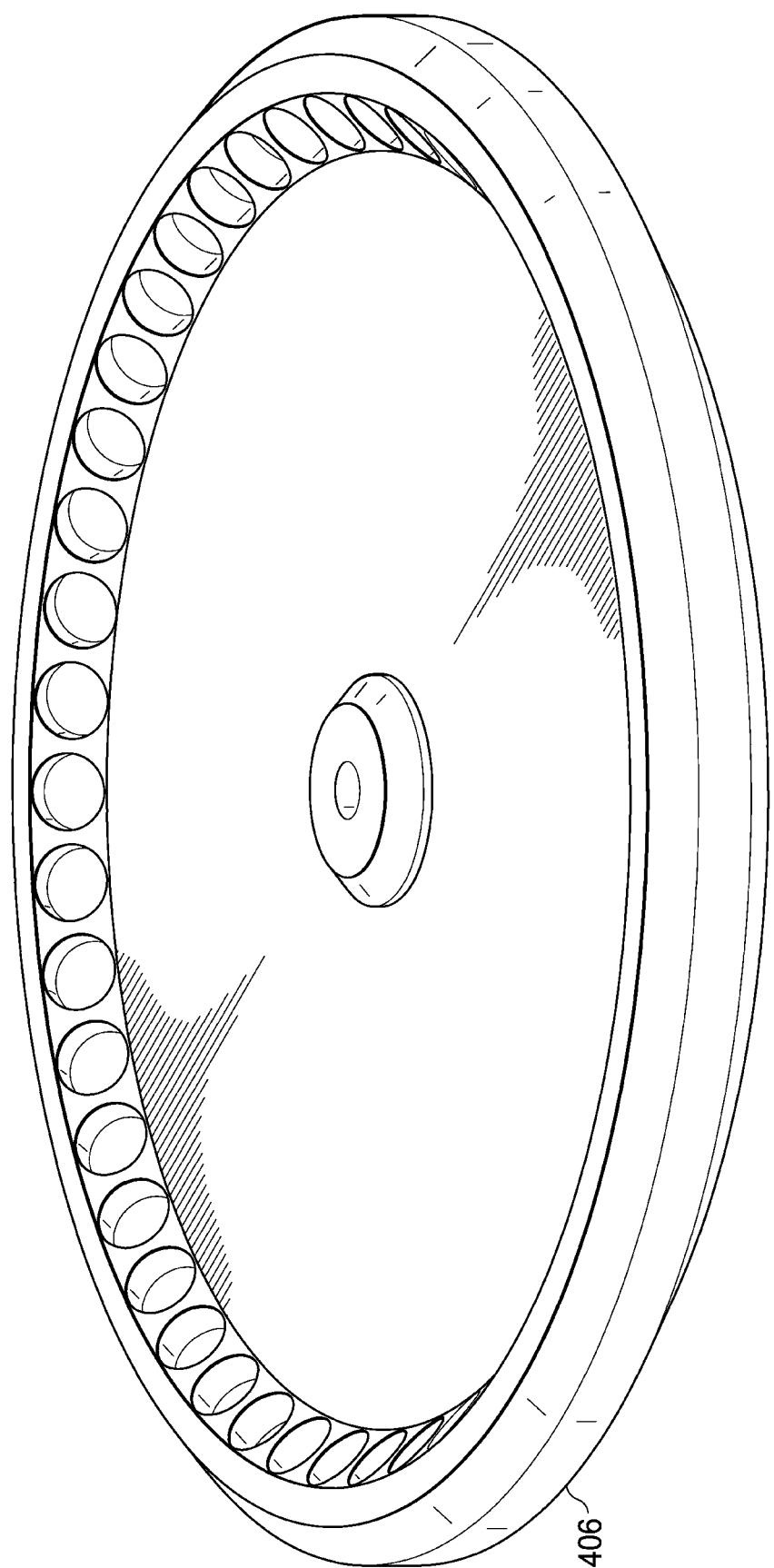

FIG. 4(*a*) shows a perspective view of a magnetic levitator 400 according to a second embodiment of the present invention. The levitator 400 comprises a first portion 402 having a first support structure 406 and a first arrangement of magnets 408, a second portion 404 having a second support structure 410 and a second arrangement of magnets 412, and a rod 414. FIG. 4(*b*) and FIG. 4(*c*) respectively show schematic diagrams of the second and first support structures 410, 406. The levitator 400 is similar to the levitator 100, except that the first and second portions 402, 404 of the levitator 400 are respectively larger than the first and second portions 102, 104 of the levitator 100. Specifically, the first and second support structures 406, 410 are respectively larger than the first and second support structures 106, 110. To elaborate, the first support structure 406 of the levitator 400 has a diameter of 15 cm, whereas the first support structure 106 of the levitator 100 has a diameter of 4 cm. In addition, the first and second arrangements of magnets 408, 412 in the levitator 400 also have circumferences larger than the respective circumferences of the first and second arrangements of magnets 108, 112 in the levitator 100.

Various modifications will be apparent to one skilled in the art.

For example, the support structures 106, 110, 406, 410 of the magnetic levitators 100, 400 need not be in the shapes described above. They may be in other shapes depending on their usage. Further, each array can include any number of magnets and the magnets need not be arranged in a single circle, but can also be arranged in more than one circle.

Similarly, the structure 200 may take on different forms, with the first and second housings 202, 204 being in different shapes. The structure 200 may comprise more than two arrays of magnets, for example, a stack of arrays with one of the arrays fixed in position and the other arrays floating above this fixed array, with each array being apart from a lower array by a specific distance.

It is also possible to place an array of magnets outside of the inner array (i.e. forming two concentric arrays of magnets), with the arrays separated by a distance such that the inner array is in a neutral position that is at the center of the outer array. When the inner array is moved, the restorative force restores the inner array to the central neutral position. Such an arrangement does not allow the outer array to be constructed as a disk with a rotational bearing connected to the central array. Further, neither of the arrays will be levitated in this case as there is no repulsive force to lift the array.

Figure 5A:
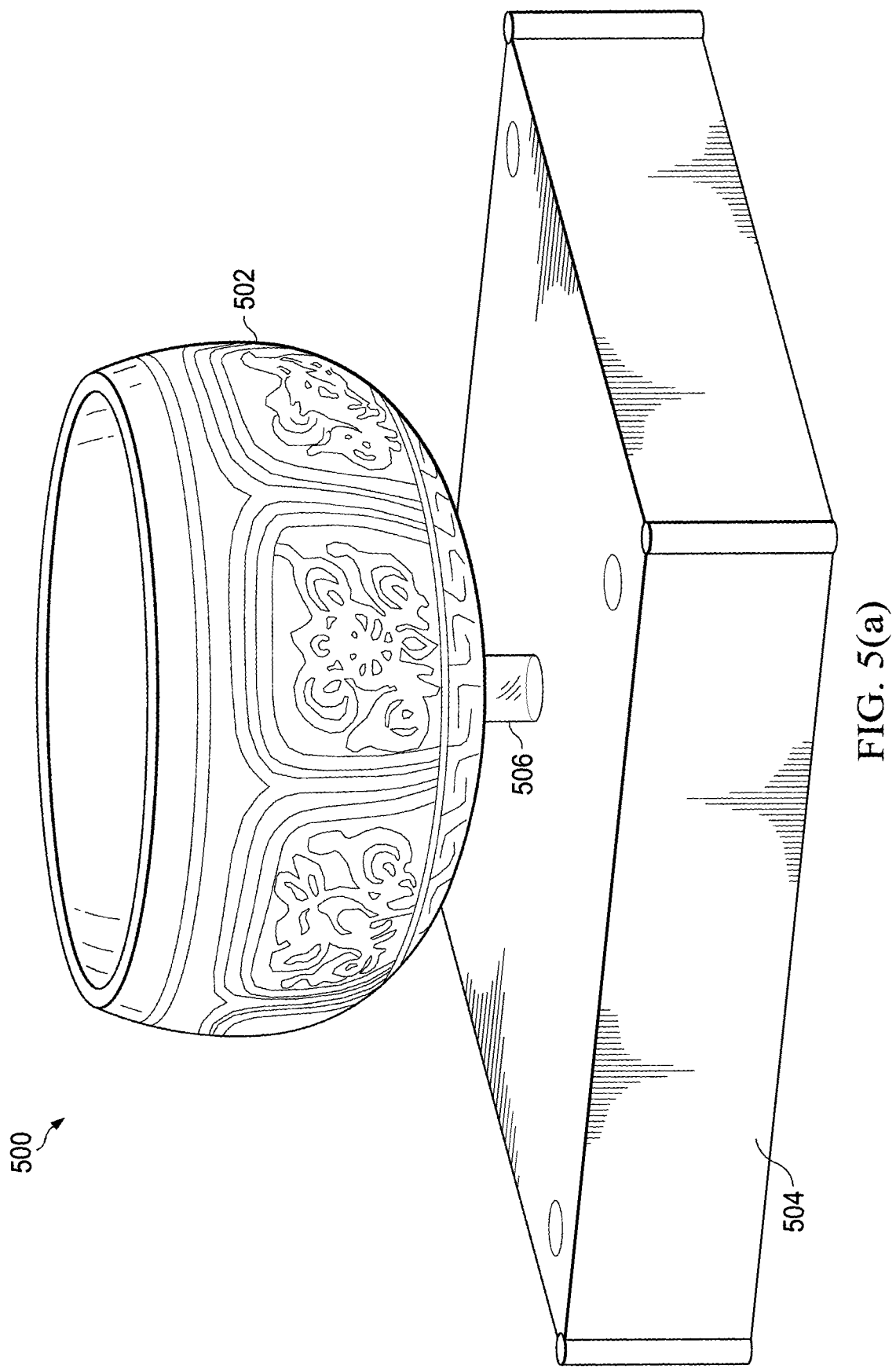
FIGS. 5(a)-5(c) respectively shows a perspective view, a side view and a top view of a musical device which is a first example of the structure of FIG. 2(a)
Figure 5B:
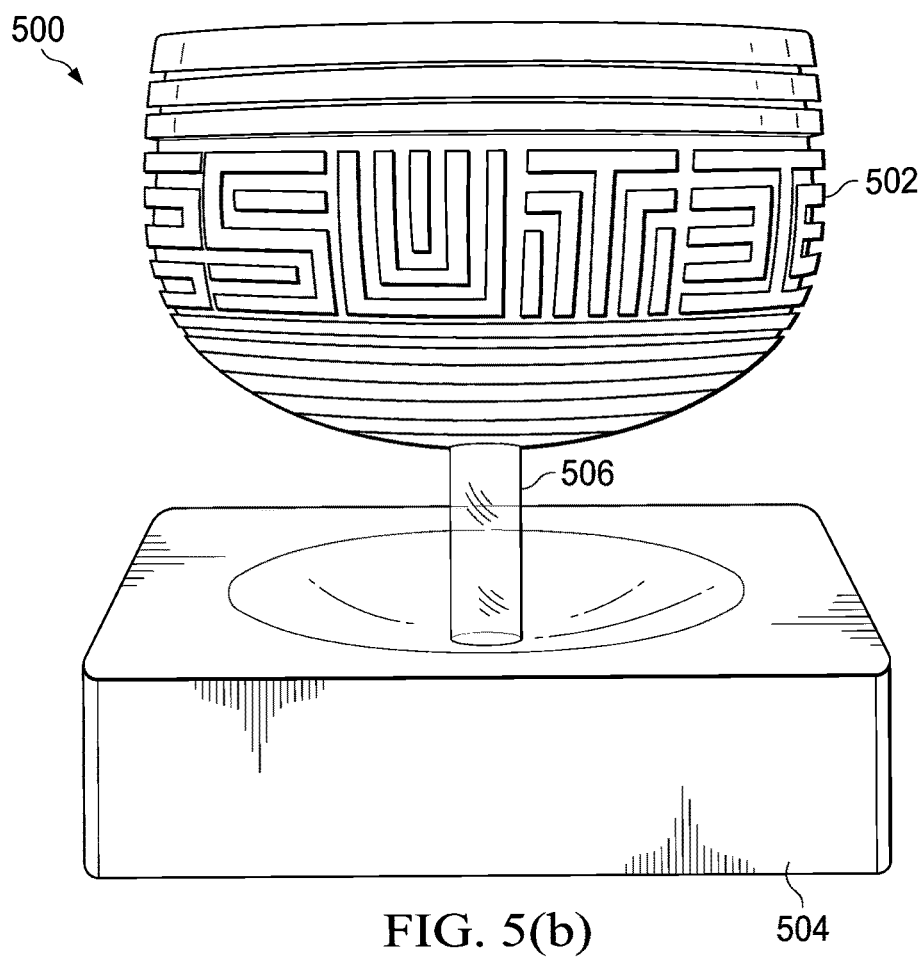
Figure 5C:
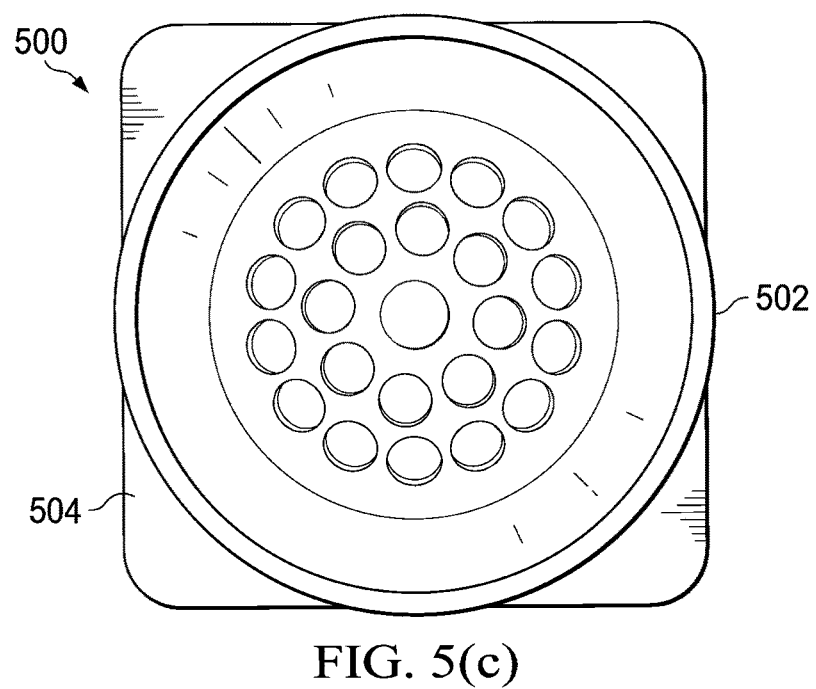

FIGS. 5(*a*), 5(*b*) and 5(*c*) respectively shows a perspective view, a side view and a top view of a musical device 500 which is an example of a form the structure 200 may take. The device 500 comprises a bowl 502, a rectangular platform 504 and a supporting device in the form of a transparent rod 506. The bowl 502 is similar to a typical singing bowl and is made of brass.

Figure 6:
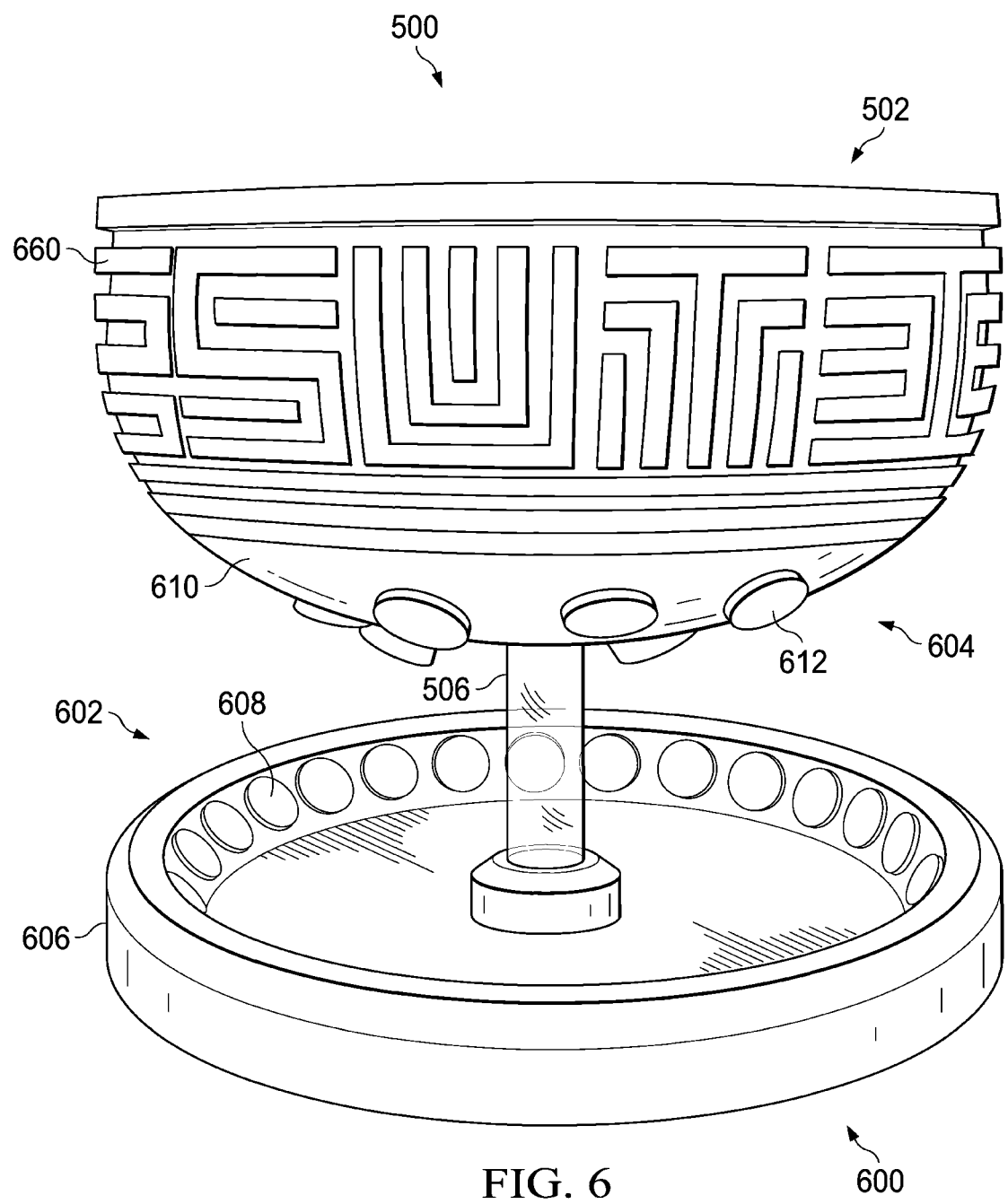
FIG. 6 shows a side view of the device of FIG. 5(a) with some parts removed.

FIG. 6 shows a side view of the device 500 with some parts removed to reveal a magnetic levitator 600 which is a variant of the levitator 100. The levitator 600 is similar to the levitator 100 in that the levitator 600 also comprises a first portion 602, a second portion 604 and a supporting device in the form of the rod 506. The first portion 602 also has a first support structure 606 and a first arrangement of magnets 608 arranged in first magnet holes of the structure 606, whereas the second portion 604 also has a second support structure 610 and a second arrangement of magnets 612 arranged in second magnet holes of the structure 610. In addition, the first and second support structures 606, 610 also each has a support hole to allow the rod 506 through. However, there are some differences between the levitator 600 and the levitator 100. Firstly, the support structures 606, 610 of the levitator 600 differ in shapes from those of the levitator 100. In particular, the first support structure 606 has a circular base coupled with a circular upright wall, whereby the top of the wall includes a slanted surface with the first magnet holes, whereas the second support structure 610 is semi-spherical in shape but with a cut-away end to form a shape matching a bottom of the bowl 502. Secondly, the second arrangement of magnets 612 of the second portion 604 includes two concentric circles instead of a single circle (as seen more clearly in FIG. 5(c)). This enhances the levitation force. Referring to FIG. 6, the device 500 further includes a third portion in the form of a bell 660 which has a harmonic resonance frequency. The bell 660 with the second portion 604 forms the bowl 502.

FIGS. 7(a)-7(b) and 8(a)-8(b) show the manufacturing of the device 500.

Figure 7A:
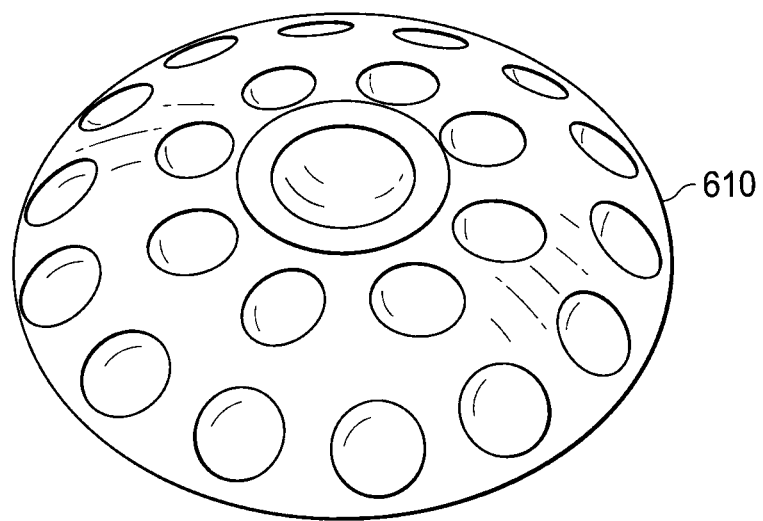
FIG. 7(a) shows a perspective view of a support structure of the device of FIG. 5(a) and FIG. 7(b) shows insertion of magnets into the support structure of FIG. 7(a)

In particular, FIG. 7(a) shows a perspective view of the second support structure 610. This second support structure 610 is manufactured via additive manufacturing. The first support structure 606 is also manufactured via additive manufacturing.

Figure 8A:
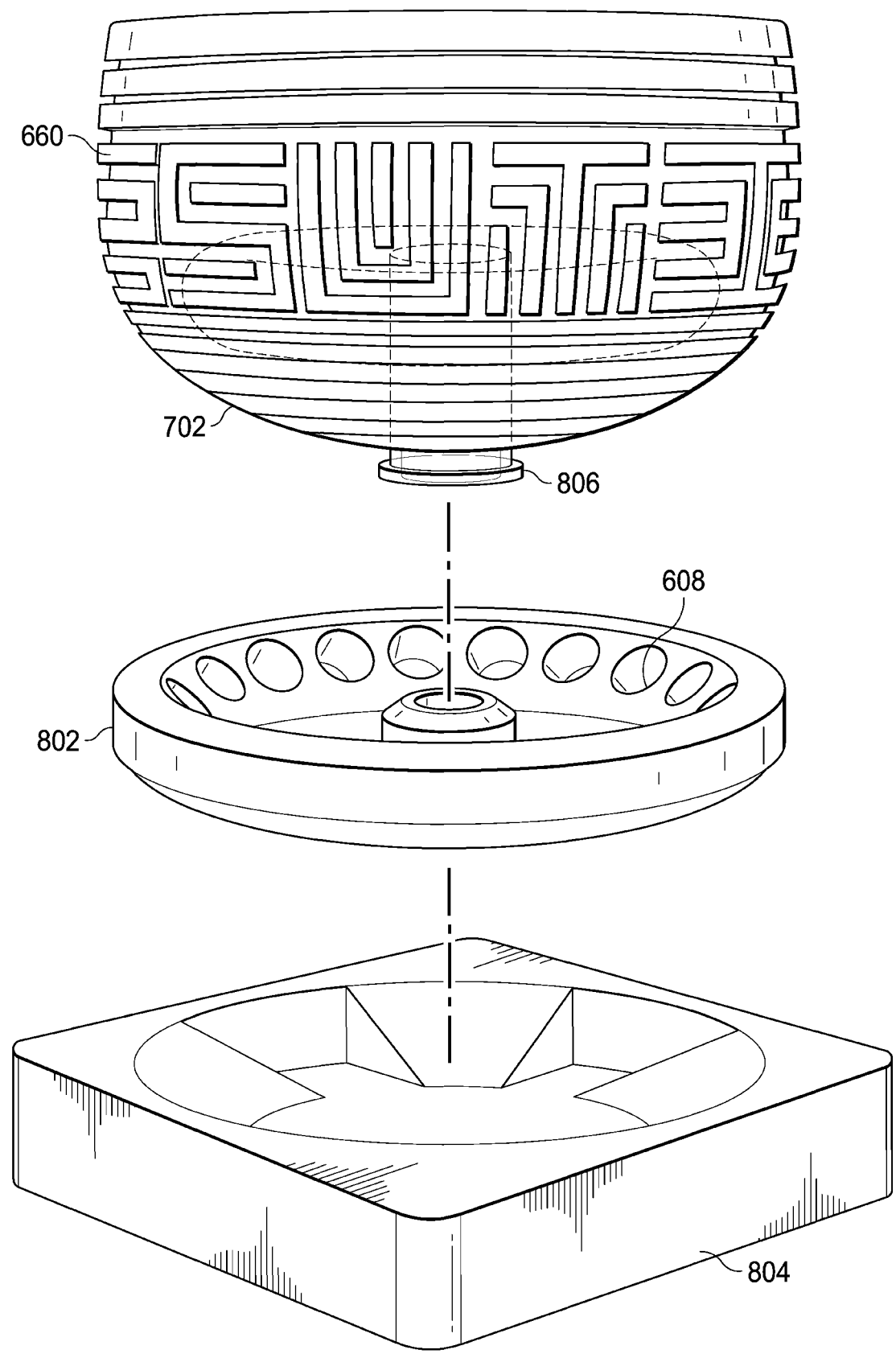
FIG. 8(a) shows the assembling of different parts of the device of FIG. 5(a) and FIG. 8(b) shows an enlarged view of a clamping joint used for the assembling.

The first and second support structures 606, 610 are then respectively placed in a first housing 802 (see FIG. 8(a)) and a second housing 702. The first housing 802 and the second housing 702 each includes holes matching the magnet holes of the respective support structures 606, 610. These housings 802, 702 also include support holes matching the support holes of the respective support structures 606, 610.

Figure 7B:
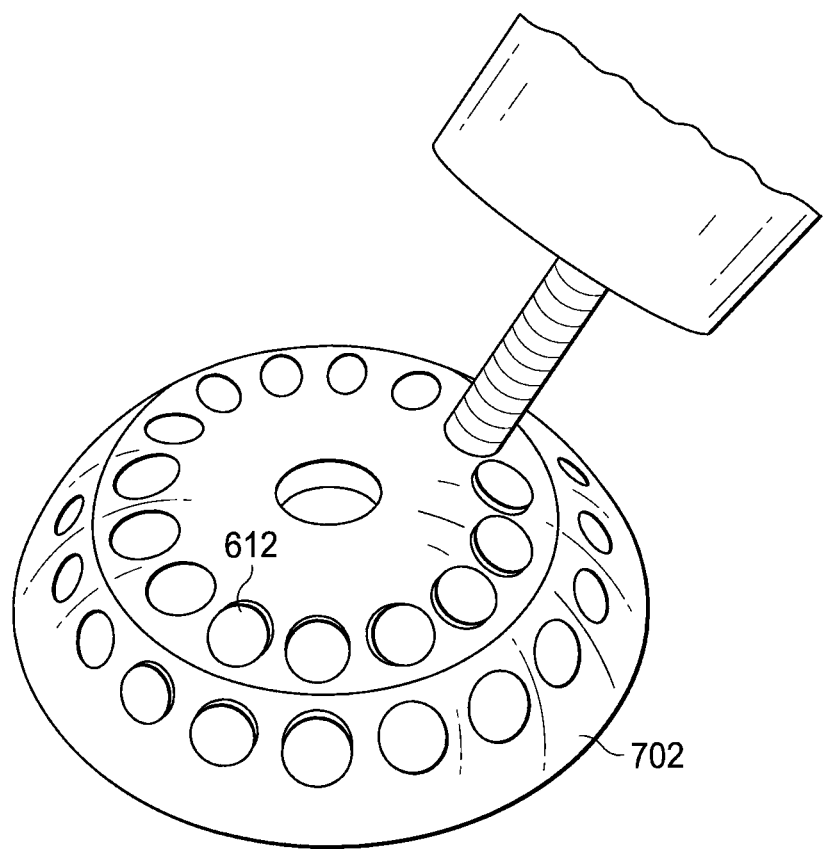

FIG. 7(b) shows the magnets 612 being inserted through the holes of the second housing 702 into the magnet holes of the second support structure 610. The magnets 612 are secured in the magnet holes of the second support structure 610 via interference joining (or in other words, friction fitting). Similarly, the magnets 608 are also secured in the magnet holes of the first support structure 606 via interference joining.

FIG. 8(a) shows how the first and second housings 802, 702 (holding respective first and second portions 602, 604 of the levitator 600 which are not visible in FIG. 8(a)) are assembled with the bell 660 and a fourth portion in the form of a base 804.

Figure 8B:
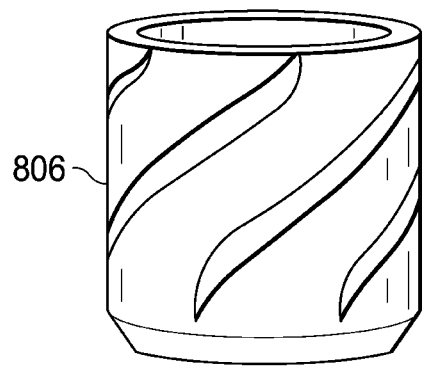

To form the bowl 502, the bell 660 is removably coupled to the second portion 604 of the levitator 600. In particular, the second housing 702 is first placed inside the bell 660 at the base of the bell 660. This allows the bell 660 to block a user's view of the second housing 702, improving the aesthetic appearance of the device 500. The bell 660 has a hole at its base and the second housing 702 is positioned with its support hole (and thus, the support hole of the second support structure 610) aligned with the hole at the base of the bell 660. A multi-component clamp design is then used to secure the bell 660 with the second housing 702. In particular, the support hole of the second support structure 610 has a first screw-thread (to allow the second support structure 610 to serve as a first component of the multi-component clamp design). A second component of the clamp design includes a clamping pin 806 having a through-hole and having a second screw-thread on its outer surface, the second screw-thread being compatible with the first screw-thread. FIG. 8(b) shows an enlarged view of the clamping pin 806. To form the bowl 502, the clamping pin 806 is passed through the hole at the base of the bell 610 and then screwed into the support hole of the second support structure 610 via the first and second screw-threads. This clamps the bell 660 between the clamping pin 806 and the second housing 702 to form the bowl 502. The bell 660 only touches the clamping pin 806 at the boundary of the hole at its base which has a diameter of only 2 mm. This helps reduce resonant dumping.

Next, to form the platform 504, the first housing 802 is placed into a receptacle of the base 804. The rod 506 is then placed through the support hole of the first housing 802 and the through-hole of the clamping pin 806 to couple the bowl 502 with the platform 504. Plain bearings (not shown in FIG. 8(a)) serve as the interface between the rod 506 and the clamping pin 806. This allows the clamping pin 806 to be movable along and rotatable about the rod 506, in turn allowing the bowl 502 to be movable along and rotatable about this rod 506. A small inset (not shown in FIG. 8(a)) is connected to a bottom of the bowl 502 so that the clamping pin 806 is not visible from underneath the bowl 502. The platform 504 is fixed to the rod 506 and is prevented from moving along the rod 506. The platform 504 can however rotate about the rod 506.

In use, the bowl 502 is locked at a neutral position a distance away from the platform 504 using the levitator 600. Therefore, the bowl 502 appears to be floating, especially since the supporting device is in the form of a transparent rod 506 that is hardly visible to a user. A musical tone can be produced when the bowl 502 is struck. More specifically, the device 500 can be played by striking the bowl 502 with a dowel or rotating the dowel around the rim of the bowl 502 (similar to how a traditional singing bowl is played). The device 500 has a harmonic resonance and notes can be tolled through inductive vibration. In other words, the device 500 is a levitating musical instrument and this is achieved without application of external energy. The levitating of the bowl 502 helps to achieve a lower resonant damping. Note that the bell 660 in the device 500 may be replaced by any other resonating objects such as symbols, chimes, other types of bells/singing bowls, other percussive musical instruments etc. to form a different musical device.

Figure 9:
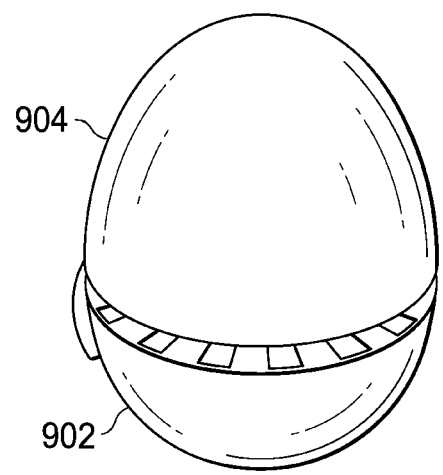
FIG. 9 shows a perspective view of a toy which is a second example of the structure of FIG. 2(a)

FIG. 9 shows a toy 900 which is another example of a form the structure 200 may take. In particular, the toy 900 takes the shape of an egg, and includes a first half 902 and a second half 904. The toy 900 also includes a levitator which is a variant of the levitator 100, and therefore comprises parts similar to those of the levitator 100. The first half 902 comprises the first portion of the levitator, whereas the second half 904 comprises the second portion of the levitator. The second portion (and hence, the second half 904) is movable along the support axle i.e. it is free to slide up and down the support axle, but the first portion (and hence, the first half 902) is not. However, both the first and second portions are rotatable about the support axle and the rotation of each portion is independent of the rotation of the other portion. Due to the arrangement of the magnets in the levitator as explained with reference to FIGS. 3(a)-3(c) above, the second half 904 is held at a neutral position a distance away from the first half 902. If the second half 904 is moved towards or away from the first half 902, a restorative force moves the second half 904 back to the neutral position. The toy 900 also has a self-righting (in other words, self-aligning) property that allows it to return to an upright position when rolled around. This self-righting property is achieved using a weight placed in the first half 902 of the toy 900.

Further, the magnets of the levitator need not be arranged in the same manner as those in the levitator 100 or the levitator 400. The tilt angles of the magnets in the configuration shown in FIG. 2(*b*) may be varied and the relative diameters of the arrays may be changed. Needless to say, changing the angles may affect the ratio of attraction/repulsion (or effectively the location of the neutral position/distance between the two arrays). Also, changing the relative diameters of the arrays may affect the overall strength of the interaction (i.e. magnitude of attractive or repulsive force at any position).

In fact, the first and second arrangements of magnets need not even be circular and the magnets need not be regularly spaced apart. Other arrangements of magnets are possible as long as the first and second arrangements of magnets are rotationally symmetrical, and as long as one of the arrangements is smaller than the other. By "smaller", it is meant that the largest distance between two points of different magnets in one arrangement is smaller than the largest distance between two points of different magnets in the other arrangement. With one of the arrangements smaller than the other, as the smaller arrangement approaches the bigger arrangement, the net field effect changes and this achieves the locking effect (or in other words, a balanced attraction and repulsion).

Although the tilt angles and placement of the magnets in the arrays can be altered, there is a critical point when the fields are no longer in a two-phase alignment and the arrays will exhibit either a pure repulsion or pure attraction behavior. Altering the angle of the arrays will also proportionally alter the ratio of repulsion to attraction and could be employed intentionally as a means to tune the force profile for a specific application. It is to be appreciated that the precise limits for the angle between the two arrays (which is dependent on the angles at which the magnets are tilted) where a locking effect can occur depends on the geometry and strength of the permanent magnets used, which would therefore consequently change the magnetic field shape generated.

Note that it is preferable that in at least one of the arrays, the magnets are placed relatively close to each other with regards to the spacing along the radius of rotational symmetry. Otherwise there may be a gap in the repulsion force and the arrays may not be stable during rotation. It is possible however, that one of the arrays comprises sparsely arranged magnets. In other words, at least one array of magnets is preferably closely packed, whereas the other array can be either sparsely or closely packed.

Figure 10A:
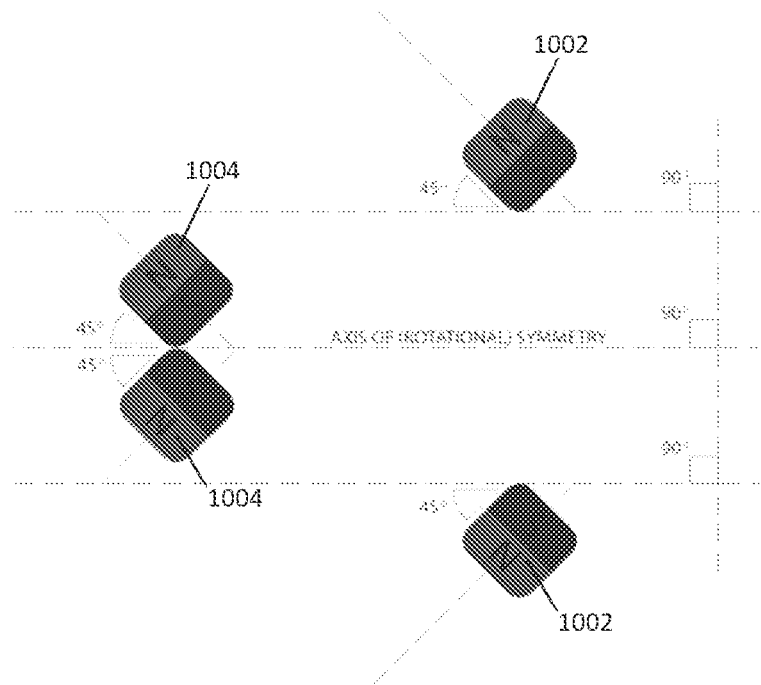
FIGS. 10(a)-10(b) respectively shows first and second alternative arrangements of magnets.
Figure 10B:
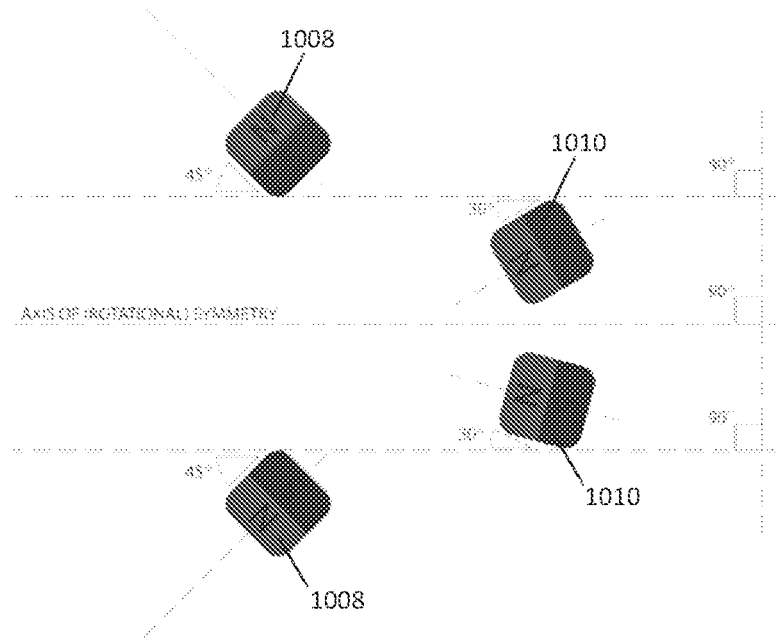

FIG. 10(*a*) shows a first alternative arrangement of magnets. Similar to the arrangement of magnets 102, 104 in the levitator 100, this first alternative arrangement comprises a plurality of magnets 1002 in a bigger circular array and a plurality of magnets 1004 in a smaller circular array. Each array of magnets 1002, 1004 is also rotationally symmetrical. However, in the alternative arrangement, the magnets 1002 of the bigger array are oriented with their North poles facing the smaller array, and the magnets 1004 of the smaller array are oriented with their South poles facing the bigger array. The magnets 1002 of the bigger array are tilted at an angle of 45 degrees with respect to the longitudinal axis of the first portion, away from the center of the array as viewed from the smaller array. The magnets 1004 of the smaller array are tilted at an angle of 45 degrees with respect to the longitudinal axis of the second portion, towards the center of the array as viewed from the bigger array. This alternative arrangement is also able to form a locking well that maintains the separation between the two arrays at a particular distance (thus, holding one of the arrays at a neutral position if the other array is fixed in position). However, as compared to the arrangement of the magnets 108, 112 shown in FIG. 2(*b*), the attractive and repulsive forces between the two arrays in FIG. 10(*a*) are weaker as the distances between the corresponding magnetic poles in the arrays in FIG. 10(*a*) are larger than those in FIG. 2(*b*).

FIG. 10(*b*) shows a second alternative arrangement of magnets. This second alternative arrangement of magnets also comprises a bigger circular array of magnets 1008 and a smaller circular array of magnets 1010 similar to the bigger and smaller arrays in the levitator 100. However, instead of 45 degrees, the magnets 1010 of the smaller array are tilted towards the center of the array as viewed from the bigger array, at an angle of 30 degrees with respect to the longitudinal axis of the second portion. This second alternative arrangement is also able to form a locking well which maintains the separation between the two arrays at a particular distance (thus, holding one of the arrays at a neutral position if the other array is fixed in position). However, the attractive and repulsive forces between the two arrays are also weaker as compared to the arrangement in FIG. 2(*b*). Hence, the magnets 1008, 1010 of FIG. 10(*b*) can be pulled out of the locking well with a very small force.

It is not necessary to have one of the arrays fixed in position. It is possible to have both arrays free to move (either rotate or translate). The desired motion profile can be achieved with bearings such as pillow blocks or sliding bearings. The specific bearings used are not critical as long as the desired rotation and translation can be achieved. It is also possible to have the smaller array fixed in position with the larger array free to move. Whether to have both arrays free to move, the larger array free to move while the smaller array is fixed in position or the smaller array free to move while the larger array is fixed in position depends on the desired purpose of the levitator, the strengths of the magnets and the weight of the housings.

To achieve stable locking, the respective arrays are preferably constrained to translation along the axis of rotational symmetry (although they may also be configured to rotate about this said axis). In the above-described embodiments, this is achieved with the use of the supporting device. Nevertheless, this supporting device may be removed to allow the arrays to move freely in other directions as well.

In addition, the first and second support structures may be non-symmetric in shape as long as the first and second arrangements of magnets are rotationally symmetric.

Embodiments of the present invention have several advantages, some of which are described below.

For example, by using additive manufacturing to manufacture the support structures of the levitators, the magnet holes that serve to contain, orient and align the magnets can be formed at more precise locations. This allows the magnets to be held in three dimensional arrays that are more precisely formed so the desired magnetic field properties can be achieved. As compared to other manufacturing methods, using additive manufacturing is a simple and flexible way for aligning the magnets. It can help reduce the cost or complexity of achieving the desired arrays. By placing permanent magnets into arrays, it is possible to develop complex magnetic fields which can have a variety of purposes, particularly for the design of various mechanisms and bearings which employ compound magnetic repulsion and attractive forces.

Further, using interference joining to insert the magnets into the magnet holes of the support structures removes the need for additional fasteners or support hardware to secure the magnets to the respective portions.

Yet another advantage of the levitators in the embodiments is that the magnets are permanent magnets and hence, the levitators do not require any external power supply. However, it is possible to include an independent subsystem having an external power supply arranged with the levitator for applying light to make a display more visible or brightly lit.

The arrays of magnets in the embodiments collectively form a repulsive-attractive array (which can also be described as a magnetic well bearing). As described above, at least two arrays of permanent magnets are aligned in such a way so that the magnetic well bearing provides a restorative force to deflections of the arrays along an axial direction. Such deflections can be caused by either repulsive or attractive forces. Both the magnetic arrays may be supported by a central axis. One array can be free to rotate about the central axis and to oscillate (travel) along the axis of rotation with a linear translation, while the other array is fixed in position. When there is a translation of the free array either in the positive or negative axial direction, the magnetic arrays or magnetic well bearing provides a restorative force on the arrays to move the free array back to a neutral position along the axial direction. At the neutral position, the two magnetic arrays may be out of plane by a certain distance. The restorative force is achieved by the interaction of the magnetic arrays and is provided in response to translations of one or both of the arrays in either the positive or negative axial direction. The restorative force does not require any physical contact between the arrays.

The magnetic well bearing formed by the embodiments of the present invention can provide a rotational bearing with a unique bearing force profile. Bearings are fundamental machine components and thus, there are many potential applications of the embodiments of the present invention. For example, in cases where a mechanical system is subject to linear vibrations along the axial direction of a rotating shaft, embodiments of the present invention can greatly reduce system wear or shock propagation throughout a drivetrain of the system. This is because the two halves of the bearing formed by the two magnetic arrays of the levitator in the embodiments are not in contact. Therefore, the bearing can help reduce noise vibration and harshness (which may arise when a traditional rotational bearing is subject to axial vibration).

Furthermore, since the restorative force can be provided without contact in the embodiments of the present invention, the bearing force profile achieved by the embodiments can demonstrate a captivating principle of magnetics which can be applied for various educational or entertainment purposes. For example, aesthetically appearing structures such as levitating artefacts or structures having objects appearing to float in mid-air can be formed. The levitation array (i.e. the array that is levitated while the other array (support array) is fixed in position) offers a unique aesthetic appearance of levitation. Such a levitation array is typically achieved through active control with electromagnets and sensors. However, unlike these typical methods, the levitator of the embodiments in the present invention does not require sensors or external power supply.

Further, unlike repulsive arrays which typically rely on the Hallbach effect and must be rotating to achieve levitation, the levitation of an array can be achieved by the embodiments of the present invention regardless of whether the array is still or rotating. As compared to prior art which uses passive magnetic bearing forces which are purely repulsive, the two-directional restorative force achieved by the embodiments of the present invention helps to maintain the separation between the two arrays at a particular distance more effectively.

Achieving the locking effect using the repulsive-attractive arrays is also more difficult than achieving a pure repulsion or pure attraction effect. To obtain the latter effect, the two arrays are usually of the same size and are simply arranged with like poles (North-North or South-South) of the magnets in the arrays facing each other so the magnets repel each other, or with unlike poles (North-South or South-North) of the magnets in the arrays facing each other so the magnets attract each other. On the other hand, to form the repulsive-attractive arrays, the magnets in each array have to be arranged in a particular configuration relative to the magnets in the other array as described above.

Embodiments of the present invention can not only provide unique aesthetic qualities, they can also provide unique human interaction, playing, and actuation of an instrument, and desirable vibrational properties such as a potentially lengthened resonance after impulse forces are applied. An example of this is the musical device 500 of FIG. 5(*a*). This device 500 has particular advantages. Firstly, the smaller array of magnets 612 is placed inside the bell 660, so the bell 660 blocks a user's view of the smaller array. Secondly, a transparent rod 506 is used to couple the bowl 502 with the platform 504, so as to restrict movement of the bowl 502 along its longitudinal axis. These first and second features of the device 500, together with the properties of the levitator 600, help create and enhance the optical illusion of the bowl 502 floating in mid-air. Thirdly, the musical device 500 can be played by striking the bowl which is free to rotate about and move along the rod 506. Fourthly, the levitation of an object or sculpture which has a harmonic resonance (such as the brass harmonic bowl 502 which includes the bell 660 that generates a tone when struck) provides a clearer view of the resonator (the bell 660). These third and fourth features of the device 500 enhance the user experience of striking the bell 660 and can also provide a multi-physical experiential effect for an observer. Fifthly, the musical device 500 includes an interior bearing (the repulsive-attractive arrays of magnets 608, 612) and a clamping joint 804 that connects the levitation array of magnets 612 to the ringing component (the bell 660) with a minimal profile. This allows the bell 660 to resonate while maintaining a fixed relative position to the interior bearing.

Embodiments of the present invention also have multiple commercial applications. Some examples of these commercial applications are as follows.

The embodiments can be used to form a levitated sculpture or a sculpture with a levitated object. In the latter, the levitation array can be hidden inside the object to be levitated.

For example, the embodiments can be used to form commercial small scale levitating display desk sculptures. The levitated object may vary specific to the customer or sales/usage context. The levitated object could be a musical instrument.

The embodiments may also be used to form commercial toys or educational devices. It is possible to construct a version of the levitated array which can withstand frequent handling and which can be used to demonstrate the magnetic locking or magnetic well bearing between the arrays, or magnetic attraction/repulsion in an interactive way.

With the force profiles provided by the repulsion-attraction configurations of the magnetic arrays in the embodiments, in particular the magnetic well bearing, the embodiments may be used as a bearing product with several specific applications. This is because the magnetic well bearing can help reduce shock propagation and/or wear in various conditions. In one example, the levitator in the embodiments may be used as a machine bearing with vibrational isolation along the z-axis. This can be achieved because of the non-contact between the two portions of the levitator. Such non-contact can help to reduce transmissions of small vibrations through the z-direction (such transmissions may be detrimental in certain systems). For example, the embodiments may be used in the field of industrial bearings, particularly in cases where it is desired to reduce the transmission of harsh vibrations through the shaft to the support array (i.e. to reduce shock propagation). One specific usage may be in the field of mechanical drive trains. Another specific usage may be to place one of the arrays of the levitator at the base of a vertical wind turbine—vertical wind turbines are known to have high efficiency but they also produce substantial reaction forces at the base. The use of the levitator can help to reduce friction induced wear.

The invention claimed is:

1. A magnetic levitator comprising:
   a first portion having a first arrangement of a plurality of permanent magnets, and the first arrangement has first and second circumferences; and
   a second portion having a second arrangement of a plurality of permanent magnets, and the second arrangement has a third circumference,
   wherein the first and second arrangements are rotationally symmetrical, and the first circumference is larger than the third circumference, and
   wherein in use, one of the portions is magnetically levitated by the other one of the portions, and the second circumference is arranged substantially aligned to the third circumference,
   wherein the first circumference is an outer circumference of the first arrangement, and the second circumference is an inner circumference of the first arrangement,
   wherein the third circumference is an outer circumference of the second arrangement,
   wherein the second circumference is substantially equal to the third circumference,
   wherein the plurality of permanent magnets of the first arrangement are tilted towards a center of the first portion as viewed from the second portion,
   wherein the plurality of permanent magnets of the second arrangement are tilted towards a center of the second portion as viewed from the first portion,
   wherein magnetic fields of the first and second arrangements are perpendicular to each other, thereby locking the second portion at a neutral position at a set distance from the first portion such that when the second portion is urged towards the first portion, a repulsive force between the first arrangement and the second arrangement restores the second portion to the neutral position, and when the second portion is urged away from the first portion, an attractive force between the first arrangement and the second arrangement restores the second portion to the neutral position,
   wherein location of the neutral position is changeable by varying angle of tilt of the plurality of permanent magnets of the first arrangement and varying angle of tilt of the plurality of permanent magnets of the second arrangement, and
   wherein magnitude of the attractive force and magnitude of the repulsive force are changeable by varying the first circumference and varying the second circumference.

2. The levitator of claim 1, wherein the first and second arrangements of plurality of permanent magnets are configured to be interference fitted to the first and second portions respectively.

3. The levitator of claim 1, further comprising a supporting device configured to coaxially and movably couple the first and second portions, when in use.

4. The levitator of claim 3, wherein the supporting device has a longitudinal axis and is configured to restrict translation of one or both of the first and second portions to along the longitudinal axis.

5. The levitator of claim 1, wherein the plurality of permanent magnets of the first arrangement is arranged to cause the magnetic poles of respective permanent magnets to be oriented at a predetermined angle with respect to the longitudinal axis of the first portion.

6. The levitator of claim 1, wherein the plurality of permanent magnets of the second arrangement is arranged to cause the magnetic poles of respective permanent magnets to be orientated at a predetermined angle with respect to the longitudinal axis of the second portion.

7. The levitator of claim 1,
   wherein the first and second arrangements include being cooperatively configured to cause like magnetic poles of the permanent magnets of the first and second arrangements to repel to collectively generate a first region of magnetic field, and to cause unlike magnetic poles of the permanent magnets of the first and second arrangements to attract to collectively generate a second region of magnetic field; and
   wherein the first and second regions of magnetic fields interact in equilibrium to enable the magnetic levitation of the one of the portions by the other one of the portions.

8. The levitator of claim 7, wherein the arrangements are cooperatively configured by configuring distances between like magnetic poles of the permanent magnets in the arrangements and between unlike magnetic poles of the permanent magnets in the arrangements.

9. The levitator of claim 1, wherein the first and second arrangements are cooperatively configured to maintain at least one of the portions at a neutral position and wherein the at least one of the portions is urged back to the neutral position in response to both (i) the portion being moved towards the other portion and (ii) the portion being moved away from the other portion.

10. The levitator of claim 9, wherein the first and second arrangements are out of plane when the at least one of the portions is at the neutral position.

11. The levitator of claim 1, wherein the first and second arrangements comprise circular arrangements.

12. The levitator of claim 1, wherein at least one of the arrangements comprises closely packed magnets to avoid gaps in magnetic forces between the first and second arrangements.

13. The levitator of claim 1, wherein the second portion is magnetically levitated by the first portion.

14. A device comprising:
   a first portion having a first arrangement of a plurality of permanent magnets, and the first arrangement has first and second circumferences;

a second portion having a second arrangement of a plurality of permanent magnets, and the second arrangement has a third circumference;

a third portion removably coupled to the second portion; and a supporting device configured to coaxially and movably couple the first, second and third portions, wherein the first and second arrangements are rotationally symmetrical, and the first circumference is larger than the third circumference, and wherein in use, the third portion is magnetically levitated via the second portion by the first portion, and the second circumference is arranged substantially aligned to the third circumference, wherein the first circumference is an outer circumference of the first arrangement, and the second circumference is an inner circumference of the first arrangement, wherein the third circumference is an outer circumference of the second arrangement, wherein the second circumference is substantially equal to the third circumference, wherein the plurality of permanent magnets of the first arrangement are tilted towards a center of the first portion as viewed from the second portion, wherein the plurality of permanent magnets of the second arrangement are tilted towards a center of the second portion as viewed from the first portion, wherein magnetic fields of the first and second arrangements are perpendicular to each other, thereby locking the second portion at a neutral position at a set distance from the first portion such that when the second portion is urged towards the first portion, a repulsive force between the first arrangement and the second arrangement restores the second portion to the neutral position, and when the second portion is urged away from the first portion, an attractive force between the first arrangement and the second arrangement restores the second portion to the neutral position, wherein location of the neutral position is changeable by varying angle of tilt of the plurality of permanent magnets of the first arrangement and varying angle of tilt of the plurality of permanent magnets of the second arrangement, and wherein magnitude of the attractive force and magnitude of the repulsive force are changeable by varying the first circumference and varying the second circumference.

15. The device of claim 14, wherein the third portion has a harmonic resonance frequency.

16. The device of claim 14, wherein the device includes a musical device.

17. The device of any one of claim 14, wherein the first or second portion is arranged with the third portion to cause the third portion to block a user's view of the first or second portion.

18. A device comprising:

a first portion having a first arrangement of a plurality of permanent magnets, and the first arrangement has first and second circumferences;

a second portion having a second arrangement of a plurality of permanent magnets, and the second arrangement has a third circumference;

a third portion removably coupled to the first portion; and a supporting device configured to coaxially and movably couple the first, second and third portions, wherein the first and second arrangements are rotationally symmetrical, and the first circumference is larger than the third circumference, and wherein in use, the third portion is magnetically levitated via the first portion by the second portion, and the second circumference is arranged substantially aligned to the third circumference, wherein the first circumference is an outer circumference of the first arrangement, and the second circumference is an inner circumference of the first arrangement, wherein the third circumference is an outer circumference of the second arrangement, wherein the second circumference is substantially equal to the third circumference, wherein the plurality of permanent magnets of the first arrangement are tilted towards a center of the first portion as viewed from the second portion, wherein the plurality of permanent magnets of the second arrangement are tilted towards a center of the second portion as viewed from the first portion, wherein magnetic fields of the first and second arrangements are perpendicular to each other, thereby locking the second portion at a neutral position at a set distance from the first portion such that when the second portion is urged towards the first portion, a repulsive force between the first arrangement and the second arrangement restores the second portion to the neutral position, and when the second portion is urged away from the first portion, an attractive force between the first arrangement and the second arrangement restores the second portion to the neutral position, wherein location of the neutral position is changeable by varying angle of tilt of the plurality of permanent magnets of the first arrangement and varying angle of tilt of the plurality of permanent magnets of the second arrangement, and wherein magnitude of the attractive force and magnitude of the repulsive force are changeable by varying the first circumference and varying the second circumference.

\* \* \* \* \*

UNITED STATES PATENT AND TRADEMARK OFFICE
CERTIFICATE OF CORRECTION

| | | |
|---|---|---|
| PATENT NO. | : 11,114,956 B2 | Page 1 of 1 |
| APPLICATION NO. | : 15/756487 | |
| DATED | : September 7, 2021 | |
| INVENTOR(S) | : Bradley Camburn et al. | |

It is certified that error appears in the above-identified patent and that said Letters Patent is hereby corrected as shown below:

On the Title Page

Item (72)
The third listed inventor reads "Zach HUANG" and should read Zack HUANG.

Signed and Sealed this
Thirty-first Day of May, 2022

*Katherine Kelly Vidal*

Katherine Kelly Vidal
*Director of the United States Patent and Trademark Office*